US012676397B2

(12) United States Patent
Takeuchi et al.

(10) Patent No.: US 12,676,397 B2
(45) Date of Patent: Jul. 7, 2026

(54) VEHICLE WINDOW GLASS

(71) Applicant: AGC Inc., Tokyo (JP)

(72) Inventors: Shoichi Takeuchi, Tokyo (JP); Kiyoshi Nobuoka, Tokyo (JP); Masahiro Hachiro, Tokyo (JP); Hideaki Shoji, Tokyo (JP); Toshiki Sayama, Tokyo (JP); Yusuke Kato, Tokyo (JP)

(73) Assignee: AGC INC., Tokyo (JP)

(*) Notice: Subject to any disclaimer, the term of this patent is extended or adjusted under 35 U.S.C. 154(b) by 70 days.

(21) Appl. No.: 18/755,555

(22) Filed: Jun. 26, 2024

(65) Prior Publication Data

US 2024/0347895 A1 Oct. 17, 2024

Related U.S. Application Data

(63) Continuation of application No. PCT/JP2022/047279, filed on Dec. 22, 2022.

(30) Foreign Application Priority Data

Dec. 28, 2021 (JP) ................................ 2021-214751
Nov. 7, 2022 (JP) ................................ 2022-178312

(51) Int. Cl.
*H01Q 1/12* (2006.01)
*H01Q 1/32* (2006.01)

(52) U.S. Cl.
CPC ........... *H01Q 1/1271* (2013.01); *H01Q 1/325* (2013.01)

(58) Field of Classification Search
CPC .... H01Q 1/1271; H01Q 1/325; H01Q 13/085; B60J 1/20
See application file for complete search history.

(56) References Cited

U.S. PATENT DOCUMENTS 9,985,333 B2 * 5/2018 Takeuchi ............. H01Q 1/1271
10,290,932 B2 5/2019 Takeuchi et al.
(Continued)

FOREIGN PATENT DOCUMENTS

JP 2016111562 A * 6/2016
WO WO-2017/018324 A1 2/2017
(Continued)

OTHER PUBLICATIONS

International Searching Authority, "International Search Report," issued in connection with International Patent Application No. PCT/JP2022/047279, dated Feb. 28, 2023.
(Continued)

*Primary Examiner* — Daniel Munoz
(74) *Attorney, Agent, or Firm* — Foley & Lardner LLP

(57) ABSTRACT

A window glass for a vehicle including a glass plate, a light shielding layer on the glass plate and a planar antenna including a planar conductor with a hollowed-out portion with at least one hole, wherein, when a region including the light shielding layer is assumed as a light shielding region; and a region including no light shielding layer is assumed as a transmission region, the planar antenna is arranged to lie across a boundary between the light shielding region and the transmission region, and has a first conductor part overlapping the light shielding region and a second conductor part overlapping the transmission region, and, wherein, when an area of overlap of the planar antenna with the light shielding region is assumed as a first overlap area; an area of overlap of the planar antenna with the transmission region is assumed as a second overlap area.

14 Claims, 17 Drawing Sheets

(56) References Cited

U.S. PATENT DOCUMENTS

| | | | |
|---|---|---|---|
| 10,297,897 B2 | 5/2019 | Hashimoto et al. | |
| 11,171,404 B2 | 11/2021 | Takeuchi et al. | |
| 2020/0251804 A1* | 8/2020 | Takeuchi | H01Q 13/16 |

FOREIGN PATENT DOCUMENTS

| | | |
|---|---|---|
| WO | WO-2017/089435 A1 | 6/2017 |
| WO | WO-2019/093271 A1 | 5/2019 |

OTHER PUBLICATIONS

International Searching Authority, "Written Opinion," issued in connection with International Patent Application No. PCT/JP2022/047279, dated Feb. 28, 2023.

* cited by examiner

Fig. 18

| No. | Total Conductor Area ($mm^2$) | Conductor Area $S_{C2}$ ($mm^2$) in Transmission Region | $D_2$= $S_{C2}$(#*)/ $S_{C2}$(#0) | Hole Area $S_V$ ($mm^2$) in Transmission Region | $S_V/S_{C2}$ | Conductor Area $S_{C1}$ ($mm^2$) in Light Shielding Region | D1= $S_{C1}$(#*)/ $S_{C1}$(#0) | $S_{C2}/S_{C1}$ | $S_{C1}/S_{C2}$ | $D_1/D_2$ |
|---|---|---|---|---|---|---|---|---|---|---|
| #0 | 3834.1 | 1870.9 | 1.00 | 0.0 | 0.00 | 1963.2 | 1.00 | 0.95 | 1.05 | 1.00 |
| #1 | 1926.1 | 919.0 | 0.49 | 951.9 | 1.04 | 1007.1 | 0.51 | 0.91 | 1.10 | 1.04 |
| #2 | 1530.9 | 522.4 | 0.28 | 1348.5 | 2.58 | 1008.5 | 0.51 | 0.52 | 1.93 | 1.84 |
| #3 | 1676.8 | 657.3 | 0.35 | 1213.6 | 1.85 | 1019.5 | 0.52 | 0.64 | 1.55 | 1.48 |
| #4 | 733.9 | 291.2 | 0.16 | 1579.7 | 5.43 | 442.7 | 0.23 | 0.66 | 1.52 | 1.45 |
| #5 | 1330.4 | 337.5 | 0.18 | 1533.4 | 4.54 | 992.9 | 0.51 | 0.34 | 2.94 | 2.80 |
| #6 | 601.6 | 217.0 | 0.12 | 1653.9 | 7.62 | 384.6 | 0.20 | 0.56 | 1.77 | 1.69 |

VEHICLE WINDOW GLASS

This application is a continuation of PCT Application No. PCT/JP2022/047279, filed on Dec. 22, 2022, which is based upon and claims the benefit of priority from Japanese Patent Application No. 2021-214751 filed on Dec. 28, 2021 and Japanese Patent Application No. 2022-178312 filed on Nov. 7, 2022. The contents of those applications are incorporated herein by reference in their entireties.

TECHNICAL FIELD

The present disclosure relates to a window glass for a vehicle.

BACKGROUND ART

As an antenna disposed on a window glass for a vehicle, conventionally known is a planar antenna in which a grid-like hollowed-out portion is formed in a conductive film (see, for example, Patent Document 1 listed below).

PRIOR ART DOCUMENTS

Patent Documents

Patent Document 1: WO2017/018324

DISCLOSURE OF INVENTION

Technical Problem

When the hollowed-out portion formed in the planar conductor such as a conductive film is wide as in the above-mentioned planar antenna, the planar antenna becomes less noticeable whereby the window glass as a whole is considered to be improved in appearance. However, the area of a conductive body part of the planar conductor becomes narrow as the hollowed-out portion becomes wide. This may make it difficult to ensure antenna functions of the planar antenna.

The present disclosure provides a window glass for a vehicle capable of being improved in appearance and ensuring antenna functions.

Solution to Problem

According to an aspect of the present disclosure, there is provided a window glass for a vehicle, comprising: a glass plate; a light shielding layer formed on the glass plate; and a planar antenna including a planar conductor having formed therein a hollowed-out portion with at least one hole,

- wherein, in plan view of the glass plate, when a region including the light shielding layer is assumed as a light shielding region; and a region including no light shielding layer is assumed as a transmission region,
- the planar antenna is arranged to lie across a boundary between the light shielding region and the transmission region, and has a first conductor part overlapping the light shielding region and a second conductor part overlapping the transmission region, and
- wherein, when an area of overlap of the planar antenna with the light shielding region is assumed as a first overlap area; an area of overlap of the planar antenna with the transmission region is assumed as a second overlap area; a ratio of an area of the first conductor part to the first overlap area is assumed as a first conductor density; and a ratio of an area of the second conductor part to the second overlap area is assumed as a second conductor density,
- the second conductor density is lower than the first conductor density.

Advantageous Effects of Invention

According to an aspect of the present disclosure, there is provided a window glass for a vehicle capable of being improved in appearance and ensuring antenna functions.

BRIEF DESCRIPTION OF DRAWINGS

FIG. 18 is a table illustrating respective condition values in the actual measurements of the VSWR.

DESCRIPTION OF EMBODIMENTS

Figure 1:
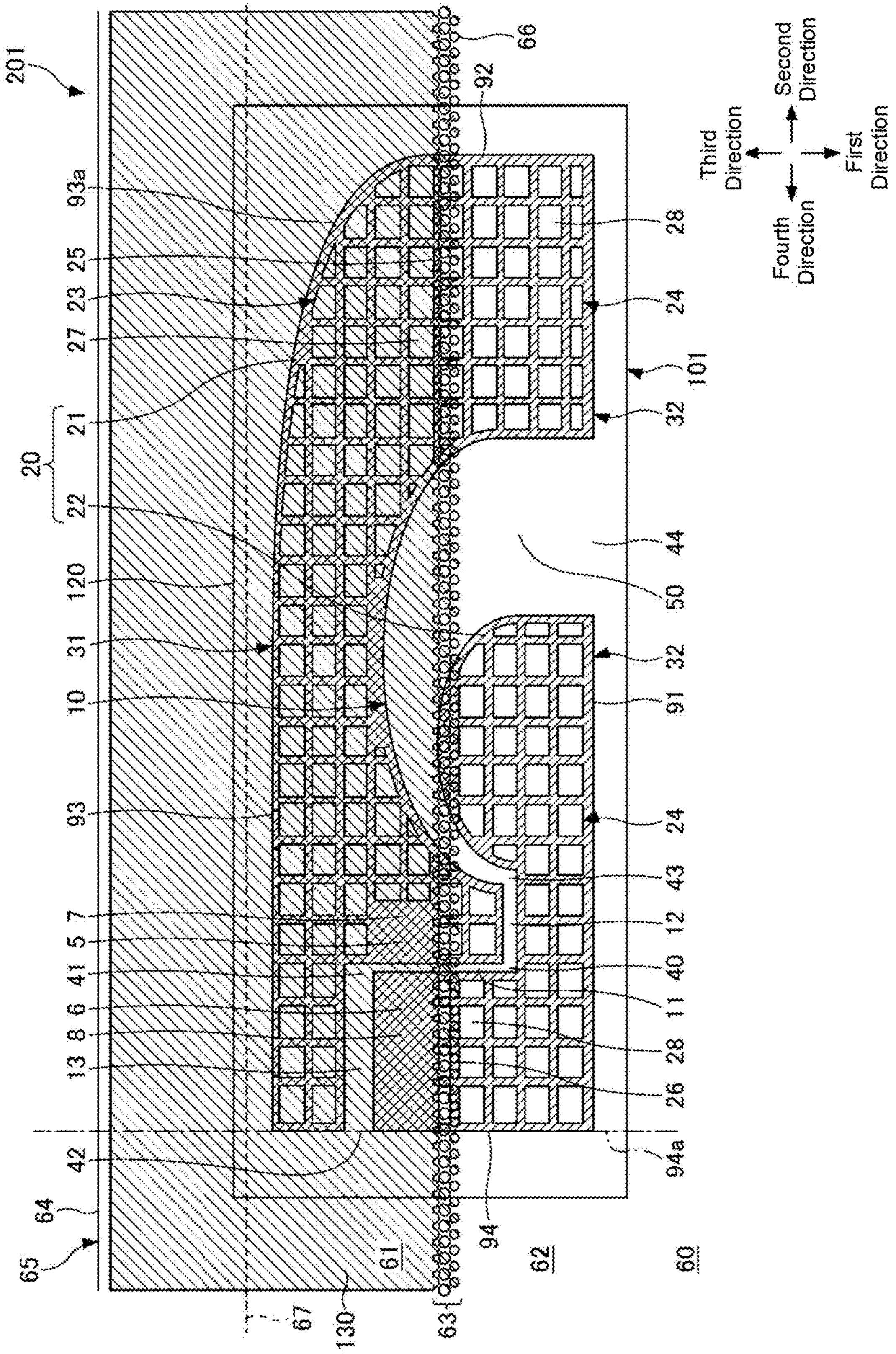
FIG. 1 is an enlarged plan view illustrating a part of a window glass for a vehicle according to a first embodiment.

Hereinafter, embodiments of the present disclosure will be described below with reference to the accompanying drawings. To facilitate understanding of the present disclosure, the scales of elements in the drawings may be different from the actual scales. Terms representing directions, such as parallel, perpendicular, orthogonal, horizontal, vertical, top-bottom and left-right, allow deviations unless the functions and effects of the embodiments are impaired.

Examples of a window glass for a vehicle according to the present embodiments include a rear glass mounted to a rear portion of a vehicle, a windshield mounted to a front portion of a vehicle, a side glass mounted to a side portion of a vehicle, and a roof glass mounted to a ceiling portion of a vehicle. The window glass for a vehicle according to the present embodiments is not limited to these examples. In the present embodiments, the window glass for a vehicle is hereinafter also simply referred to as a window glass.

FIG. 1 is an enlarged plan view illustrating a part of the window glass for a vehicle according to the first embodiment. A window glass 201 shown in FIG. 1 is an example of the window glass for a vehicle. In FIG. 1, a portion around a part of an outer peripheral edge 64 of the window glass 201 is shown in enlargement. The window glass 201 includes a glass plate 65, a light shielding layer 130 and a planar antenna 101.

Herein, a first direction, a second direction, a third direction and a fourth direction are defined as directions in plan view of the glass plate 65 or the planar antenna 101. The third direction refers to a direction opposite the first direction; and the fourth direction refers to a direction opposite the second direction. In the present embodiment, adjacent directions among the first to fourth directions intersect at a right angle (including an almost right angle). These explanations also apply to the other plan views.

The glass plate 65 is a glass plate for a vehicle, having a main surface 60 and the outer peripheral edge 64. For example, the main surface 60 is a surface on a vehicle interior side. The outer peripheral edge 64 corresponds to an outer edge of the main surface 60. A flange end 67 of a vehicle body refers to an inner peripheral edge of a flange (window frame) to which the glass plate 65 (window glass 201) is attached. The glass plate 65 can be any glass plate for a windshield, a side glass, a rear glass or a roof glass. Further, the glass plate 65 can be a single glass plate or a laminated glass in which a plurality of glass plates are laminated together with an interlayer containing a resin, such as polyvinyl butyral (PVB) or ethylene-vinyl acetate copolymer (EVA), sandwiched therebetween.

The light shielding layer 130 is a layer that blocks visible light. The light shielding layer 130 is formed on the glass plate 65, e.g., on the main surface 60 of the glass plate 65. In the case where the glass plate 65 is a laminated glass, the light shielding layer 130 may be formed on a main surface inside a plurality of glass plates constituting the laminated glass.

The light shielding layer 130 is, for example, an opaque colored ceramic layer having a thickness of approximately 5 μm to 25 μm. The color of the light shielding layer 130 is arbitrary but is preferably a dark color such as black, brown, gray or dark blue, or white, more preferably black. By overlap of a part of the planar antenna 101 with the light shielding layer 130 in plan view of the glass plate 65, the overlap part of the planar antenna 101 becomes visually less recognizable whereby the window glass 201 with the planar antenna 101 is improved in appearance.

For example, the light shielding layer 130 is provided on a strip-like area along the outer peripheral edge 64. In this case, an inner edge of the light shielding layer 130 corresponds to an outer edge of an open region (transmission region 62) of the window glass 201. In plan view of the glass plate 65, a region including the light shielding layer 130 is referred to as a light shielding region 61; and a region including no light shielding layer 130 is referred to as a transmission region 62. The light shielding region 61 is a region in which visible light is blocked by the light shielding layer 130. The transmission region 62 is a region in which visible light is not blocked by the light shielding layer 130.

The light shielding layer 130 may include a boundary region 63 in which a plurality of dots are arranged. The boundary region 63 is a region along the inner edge of the light shielding layer 130 (a boundary 66 between the light shielding region 61 and the transmission region 62) and is a gradation region in which the degree of light shielding gradually changes.

The planar antenna 101 is an example of a planar antenna in which a hollowed-out portion with at least one hole is formed in a planar conductor. In this example, a hollowed-out portion with a plurality of holes is formed in a flat conductor 20. The conductor 20 is an example of the planar conductor.

The planar antenna 101 is arranged to lie across the boundary 66 between the light shielding region 61 and the transmission region 62 in plan view of the glass plate 65. The boundary 66 is macroscopically a straight line in the illustrated example, but may contain a curve. In plan view of the glass plate 65, the planar antenna 101 has a first conductor part 31 that is a conductive body part of the conductor 20 overlapping the light shielding region 61 and a second conductor part 32 that is a conductive body part of the conductor 20 overlapping the transmission region 62.

In the example shown in FIG. 1, the planar antenna 101 includes a first hollowed-out portion 23 formed in the first conductor part 31 and a second hollowed-out portion 24 formed in the second conductor part 32. The first hollowed-out portion 23 and the second hollowed-out portion 24 are non-conductive portions where there exist no conductive body parts of the conductor 20. The first hollowed-out portion 23 is a region in which a hollowed-out part of the conductor 20 overlaps the light shielding region 61 in plan view of the glass plate 65. In the example shown in FIG. 1, the first hollowed-out portion 23 has a plurality of holes 27 formed in the conductor 20. The second hollowed-out portion 24 is a region in which a hollowed-out part of the conductor 20 overlaps the transmission region 62 in plan view of the glass plate 65. In the example shown in FIG. 1, the second hollowed-out portion 24 has a plurality of holes 28 formed in the conductor 20.

The planar antenna 101 is impedance-matched so as to be suitable for transmission and reception (either one or both of transmission and reception) of radio waves in a predetermined frequency band. The shape of the planar antenna is not limited to the illustrated shape.

It is herein assumed that: the area of overlap of the planar antenna 101 with the light shielding region 61 is a first overlap area $S_1$; and the area of overlap of the planar antenna 101 with the transmission region 62 is a second overlap area $S_2$. The first overlap area $S_1$ may be defined as, supposing that the planar antenna 101 is a solid planar conductor with no hollowed-out portion, the area of overlap of the planar antenna 101 with the light shielding region 61. Similarly, the second overlap area $S_2$ may be defined as, supposing that the planar antenna 101 is a solid planar conductor with no hollowed-out portion, the area of overlap of the planar antenna 101 with the transmission region 62. It is further assumed that: the ratio of an area of the first conductor part 31 to the first overlap area $S_1$ is a first conductor density $D_1$; and the ratio of an area of the second conductor part 32 to the second overlap area $S_2$ is a second conductor density $D_2$.

When the second conductor density $D_2$ is lower than the first conductor density $D_1$, the second conductor part 32 in the transmission region 62 is sparser than the first conductor part 31 in the light shielding region 61. As the second conductor part 32 in the transmission region 62 becomes sparser, the second conductor part 32 becomes less noticeable. Accordingly, not only the first conductor part 31 in the light shielding region 61 but also the second conductor part 32 become less noticeable. This improves appearance of the planar antenna 101 and, by extension, improves appearance of the window glass 201 as a whole. When the second conductor density $D_2$ is lower than the first conductor density $D_1$, the first conductor part 31 in the light shielding region 61 is denser than the second conductor part 32 in the transmission region 62. As the first conductor part 31 becomes dense, the area of the first conductor part 31 is relatively ensured. This makes it easy to ensure antenna functions of the planar antenna 101. Therefore, the window glass 201 is provided as a window glass for a vehicle capable of being improved in appearance and ensuring antenna functions.

For example, the appearance is improved and the antenna functions are ensured by satisfaction of the following formula:

$$D_1/D_2 > 1.00. \quad \text{formula (1a)}$$

In terms of improving the appearance and ensuring the antenna functions, it is preferable to satisfy the following formula:

$$D_1/D_2 \geq 1.03. \quad \text{formula (1b)}$$

It is more preferable to satisfy the following formula:

$$D_1/D_2 \geq 1.40. \quad \text{formula (1c)}$$

It is still more preferable to satisfy the following formula:

$$D_1/D_2 \geq 1.80. \quad \text{formula (1d)}$$

In terms of appearance improvement, the upper limit of the value of $D_1/D_2$ is not particularly limited. For example, the value of $D_1/D_2$ may be set to be 5.00 or lower, 4.00 or lower, or 3.50 or lower.

Although it is acceptable that the second hollowed-out portion 24 is provided in the second conductor part 32 for appearance improvement, the first hollowed-out portion 23 is not necessarily provided in the first conductor part 31. As long as the second conductor density $D_2$ is lower than the first conductor density $D_1$, there can be provided the window glass for a vehicle capable of being improved in appearance and ensuring antenna functions even if the first hollowed-out portion 23 is not provided in the first conductor part 31.

In terms of appearance improvement, the area of the second hollowed-out portion 24 is preferably larger than the area of the first hollowed-out portion 23. This makes the second conductor part 32 in the transmission region 62 further less noticeable, thereby improving the appearance of the planar antenna 101 and, by extension, improving appearance of the window glass 201 as a whole. Depending on the outer shape of the planar antenna 101 and the positional relationship of the boundary 66, the planar antenna 101 may preferably be configured such that the area of the widest one of the plurality of holes 28 in the second hollowed-out portion 24 is larger than the area of the widest one of the plurality of holes 27 in the first hollowed-out portion 23. With this, the appearance is improved. In terms of the appearance, the planar antenna 101 may further preferably be configured such that the area of the narrowest one of the plurality of holes 28 in the second hollowed-out portion 24 is larger than the area of the narrowest one of the plurality of holes 27 in the first hollowed-out portion 23.

In the example shown in FIG. 1, the planar antenna 101 has a feeding conductor part 7 with a feeding point 5 and a ground conductor part 8 with a ground point 6. To the feeding point 5, a signal line (not shown) is electrically connected. To the ground point 6, a ground line (not shown) is electrically connected. For example, an inner conductor (signal line) on one end of a coaxial cable is electrically connected to the feeding point 5; and an outer conductor (ground line) on one end of the coaxial cable is electrically connected to the ground point 6. To the other end of the coaxial cable, a device having one or both of a transmission function and a reception function is connected. Furthermore, a connector adaptable for transmission and reception of radio waves in a predetermined frequency band by the planar antenna 101 may be mounted to the feeding point 5 so as to establish connection of the feeding point to the device via the connector and the coaxial cable.

In the example shown in FIG. 1, the feeding point 5 and the ground point 6 are included in the first conductor part 31. At least a part of the feeding conductor part 7 and at least a part of the ground conductor part 8 overlap the light shielding region 61 in plan view of the glass plate 65, thereby making the feeding conductor part 7 and the ground conductor part 8 less noticeable. This improves the appearance of the planar antenna 101 and, by extension, improves the appearance of the window glass 201 as a whole. Even when only one of the feeding point 5 and the ground point 6 is included in the first conductor part 31, the conductor part with such one point overlaps the light shielding region 61 in plan view of the glass plate 65 whereby the appearance is improved.

In the example shown in FIG. 1, the boundary 66 extends along at least a part of an outer edge 25 of the first hollowed-out portion 23 and at least a part of an outer edge 26 of the second hollowed-out portion 24. With this, the plurality of holes 27 are aligned along the boundary 66; and the plurality of holes 28 are aligned along the boundary 66. Since the plurality of holes are orderly arranged in a uniform pattern, the appearance is improved. In the example shown in FIG. 1, the outer edge 25 is a line segment passing through a first direction-side edge of the plurality of holes 27 aligned in the second direction on the first direction side; and the outer edge 26 is a line segment passing through a third direction-side edge of the plurality of holes 28 aligned in the second direction on the third direction side. Even when the boundary 66 extends along only one of at least a part of the outer edge 25 and at least a part of the outer edge 26, the hollowed-out part of the conductor 20 is along the boundary 66 whereby the appearance is improved.

The first hollowed-out portion 23 may include the plurality of holes 27 aligned in a direction substantially orthogonal to the boundary 66 (in the example shown in FIG. 1, the first direction or the third direction). This allows linear and orderly arrangement of the plurality of holes 27 in a uniform pattern, which leads to appearance improvement. Similarly, the second hollowed-out portion 24 may include the plurality of holes 28 aligned in a direction substantially orthogonal to the boundary 66 (in the example shown in FIG. 1, the first direction or the third direction). This allows linear and orderly arrangement of the plurality of holes 28 in a uniform pattern, which leads to appearance improvement.

Herein, the total area of the plurality of holes 28 in the transmission region 62 is assumed as $S_v$; and the area of the second conductor part 32 is assumed as $S_{c2}$.

It is preferable to satisfy the following formula so as to manage both of enlarging the second hollowed-out portion 24 and securing the second conductor part 32 and thereby improve the appearance and ensure the antenna functions:

$$S_v/S_{c2} \geq 1.0. \qquad \text{formula (2a)}$$

In terms of improving the appearance and ensuring the antenna functions, it is more preferable to satisfy the following formula:

$$S_v/S_{c2} \geq 2.0. \qquad \text{formula (2b)}$$

It is still more preferable to satisfy the following formula:

$$S_v/S_{c2} \geq 4.0. \qquad \text{formula (2c)}$$

In terms of appearance improvement, the lower limit of the value of $S_v/S_{c2}$ is not particularly limited. For example, the value of $S_v/S_{c2}$ may be set to be 10.0 or lower, or 6.0 or lower.

In the case where: any of the formulas (2a), (2b) and (2c) is satisfied; and the plurality of holes 28 in the transmission region 62 are substantially uniformly arranged, the appearance is particularly improved. When the plurality of holes 28 in the transmission region 62 are of substantially the same size as each other, these holes are substantially uniformly arranged whereby the appearance is particularly improved. When the plurality of holes 28 in the transmission region 62 are aligned in a predetermined direction, these holes are substantially uniformly arranged whereby the appearance is particularly improved.

Next, the planar antenna according to the first embodiment will be described in more detail below.

The planar antenna 101 shown in FIG. 1 is a slot antenna having a slot 10 formed in the flat conductor 20. In FIG. 1, the planar antenna 101 mounted to a part of the main surface 60 of the glass plate 65 is shown in plan view of the glass plate 65 or the planar antenna 101.

The planar antenna 101 is provided with the flat conductor 20 in which the slot 10 is formed. The slot 10 is an elongated cut formed in the conductor 20.

The conductor 20 is an example of the flat conductor having a film shape or a plate shape. In this example, the conductor 20 is a conductive film (a film having conductivity) whose outer shape is substantially rectangular as a whole. In the first embodiment, the conductor 20 has an outer edge 91 on the first direction side, an outer edge 92 on the second direction side, an outer edge 93 on the third direction side and an outer edge 94 on the fourth direction side.

The conductor 20 includes a flat first planar conductor 21 situated on one side of the slot 10 and a flat second planar conductor 22 situated on the other side of the slot 10. In the present embodiment, the first planar conductor 21 and the second planar conductor 22 are separated from each other by the slot 10. The conductor 20 including the first planar conductor 21 and the second planar conductor 22 can be mounted to the main surface 60 of the glass plate 65 directly or via a dielectric layer 120.

The planar antenna 101 may have the dielectric layer 120 on which the flat conductor 20 including the first planar conductor 21 and the second planar conductor 22 is formed. The conductor 20 can be a conductor formed by baking a conductive metal-containing paste (e.g. silver paste). For example, the planar antenna 101 may have a substrate (e.g. flexible substrate) on which the flat conductor 20 including the first planar conductor 21 and the second planar conductor 22 is stacked to the dielectric layer 120. The dielectric layer 120 is preferably made of a transparent resin such as polyimide or PET (polyethylene terephthalate). The conductor 20 can be made of copper or the like. With such a laminated structure of the planar antenna 101, deviations in the dimensions of the slot 10 and the like is suppressed even though the conductor 20 is divided into the first planar conductor 21 and the second planar conductor 22. Further, it is possible to facilitate mounting of the planar antenna 101 to the mounting surface such as the main surface 60 of the glass plate 65.

The first planar conductor 21 is provided with the feeding point 5 to which the signal line (not shown) is electrically connected. The second planar conductor 22 is provided with the ground point 6 to which the ground line (not shown) is electrically connected. For example, the first planar conductor 21 is larger in area than the second planar conductor 22.

The slot 10 includes a slot 11, a slot 12, a slot 13 and a J-shaped slot 50. The slot 13, the slot 11, the slot 12 and the J-shaped slot 50 are continuously connected together in this connection order.

The slot 11 is an example of a first slot and extends in the first direction between the feeding point 5 and the ground point 6.

The slot 12 is an example of a second slot and extends in the second direction, which is different from the first direction, from a first direction-side end 40 of the slot 11.

The slot 13 is an example of a third slot. The slot 13 extends in the fourth direction from an end 41 until reaching an open end 42. The end 41 is an example of an end of the first slot opposite from the first direction-side end. The open end 42 is an example of an open end opening in the fourth direction. The open end 42 is open at the outer edge 94 in the fourth direction.

The J-shaped slot 50 extends in a J-shape from an end 43 to an open end 44. The end 43 is an example of a second direction-side end of the second slot 12. The open end 44 is an example of an open end opening in the first direction. The open end 44 is open at the outer edge 91 in the first direction.

The slot width of the J-shaped slot 50 at the open end 44 is wider than the slot width of the slot 12 at the second direction-side end 43.

In the case where a vehicle body is made of a metal, when a radiating element of a wire antenna, which is formed from a silver paste, is disposed on a window glass at a position near the vehicle body, the reception gain of the antenna tends to be lowered due to interference with the metal.

However, the planar antenna 101 according to the present embodiment is the slot antenna. In this antenna, an electric field generated by a current flowing through the conductor 20 is in a closed form inside the conductor 20. The planar antenna 101 according to the present embodiment is thus less susceptible to interference with a metal or resin.

Therefore, the planar antenna 101 according to the present embodiment is obtained with stable characteristics even when a metal part of the defogger or vehicle body is situated near the antenna or even when a resin part of the vehicle body is situated near the antenna. Even when a metallic film such as a transparent conductive film is formed around the planar antenna, the planar antenna is less susceptible to interference in the same manner as above.

The frequencies of communication waves used vary from country to country. Even within one country, the frequency bands of communication waves used vary from carrier to carrier. For these reasons, preferred is an antenna applicable to a wide bandwidth so as to transmit and receive a plurality of communication waves.

The planar antenna 101 according to the first embodiment has a plurality of slots such as the slot 11, the slot 12, the slot 13 and the J-shaped slot 50. A lower limit frequency of radio waves transmittable/receivable by the planar antenna 101 with such a plurality of slots is preferably 450 MHz, more preferably 500 MHz, still more preferably 600 MHz. An upper limit frequency of radio waves transmittable/receivable by the planar antenna is preferably 7.5 GHz, more preferably 6.5 GHz, still more preferably 6 GHz. The above-mentioned upper and lower limit frequency values can be combined as appropriate depending on communication standards used. For example, the planar antenna is preferably impedance-matched so as to be suitable for transmission and reception of radio waves in a relatively high frequency band such as UHF (Ultra High Frequency) band and a frequency band from 600 MHz to 6 GHz (sub6) for fifth generation (5G) communication standards. The above-mentioned frequency band is more preferably 450 MHz to 7.5 GHz.

The planar antenna 101 may be impedance-matched so as to efficiently transmit and receive radio waves for Wi-Fi that is one type of wireless LAN (Local Area Network). The planar antenna 101 may be impedance-matched so as to transmit and receive radio waves in a frequency band defined by communication standard IEEE 802. 11a, b, g, n, ac, ah, ax (such as 863 MHz to 868 MHz (Europe), 902 MHz to 928 MHz (U.S.), 2400 MHz to 2497 MHz (common worldwide), 5150 MHz to 5350 MHz (common worldwide), 5470 MHz to 5850 MHz (common worldwide), or 5935 MHz to 7125 MHz).

The planar antenna 101 may be impedance-matched so as to transmit and receive radio waves of frequency 2400 MHz to 2483.5 MHz as used for Bluetooth (registered trademark). The planar antenna 101 may be impedance-matched so as to transmit and receive radio waves in a frequency band (such as 755.5 MHz to 764.5 MHz (Japan) as defined by ARIB STD-T109 or 5850 MHz to 5925 MHz as defined by IEEE802.11p) for vehicle-to-infrastructure (V2I) communications and vehicle-to-vehicle (V2V) communications of intelligent transport systems (ITS). The planar antenna 101 may be impedance-matched so as to transmit and receive radio waves in a frequency band (such as 2300 MHz to 2400 MHz, 2496 MHz to 2690 MHz, or 3400 MHz to 3600 MHz) as used for another wireless communication technology WiMAX (registered trademark). The planar antenna 101 may be impedance-matched so as to transmit and receive radio waves in a low band (3245 MHz to 4742 MHz) for UWB (Ultra-Wide Band) wireless communication systems.

As described above, according to the first embodiment, there is provided the broadband planar antenna applicable to a relatively high frequency band up to about 6 GHz; and there is further provided the window glass for a vehicle with such a planar antenna.

In the planar antenna 101 shown in FIG. 1, the J-shaped slot 50 has a curved contour. As a result of the J-shaped slot 50 having a curved contour, it is possible to broaden the transmittable/receivable frequency band of the planar antenna 101.

The J-shaped slot 50 may have a portion that gradually increases in slot width. With this, it is possible to broaden the transmittable/receivable frequency band of the planar antenna 101. As shown in FIG. 1, the J-shaped slot 50 may have a portion that extends with a slot diameter gradually increasing from the second direction-side end 43 of the slot 12 and then extends in the first direction with a substantially constant slot width.

The J-shaped slot 50 may have a contour shaped along a half of an ellipse whose major axis is substantially parallel to the second direction. Since the contour of the J-shaped slot 50 becomes a smoothly curved line, it is possible to broaden the transmittable/receivable frequency band of the planar antenna 101. In particular, the planar antenna 101 shown in FIG. 1 is an example in which the J-shaped slot 50 gradually increases in slit width until the extension direction of the J-shaped slot 50 is directed to the first direction and then becomes substantially constant in slit width in a portion thereof extending in parallel with the first direction.

The J-shaped slot may be a slot bent in a J-shape and may be formed in such a shape that a straight line gets bent into a J-shape. With this, the J-shaped slot includes a plurality of line slots that are different in at least one of extension direction and length. It thus becomes easy to adjust the impedance-matching frequency of the antenna.

The J-shaped slot may have a portion that extends in the first direction with a substantially constant slot width. In the example shown in FIG. 1, the slot extends in the first direction with a substantially constant slot width. However, the J-shaped slot may alternatively have a portion that extends in the first direction with a gradually increasing or gradually decreasing slot width. For example, the J-shaped slot may extend in the first direction with a slot width gradually increasing or gradually decreasing toward the open end 44.

In the example shown in FIG. 1, the slot 13 includes a portion having a slot width wider than a slot width of the slot 11. With this, it is possible to facilitate impedance-matching of the antenna in a frequency band within the range of 600 MHz to 6 GHz. However, the slot width of the slot 13 may alternatively be the same as or narrower than the slot width of the slot 11.

As shown in FIG. 1, the slot 12 preferably has a slot length shorter than a slot length of the slot 11. With this, it is possible to facilitate impedance-matching of the antenna in a high frequency band from 2.69 GHz to 6 GHz.

In the example shown in FIG. 1, the outer edge 94 on which the open end 42 of the slot 13 is present includes a part parallel to an imaginary line 94*a* that passes through the open end 42 of the slot 13 and extends perpendicular to the extension direction of the slot 13. The outer edge 94 may include a part inclined relative to the imaginary line 94*a*.

In the planar antenna 101 shown in FIG. 1, the outer edge 93 opposed to the outer edge 91 includes a curved line part 93*a*. As a result of the outer edge 93 including such a curved line part 93*a*, it is possible to facilitate impedance-matching of the antenna in a frequency band from 750 MHz to 1 GHz. It is further possible to reduce the amount of the first planar conductor 21 used and thereby obtain improved productivity. In the first embodiment, the curved line part 93*a* as an end part of the outer edge 93 is shaped to have a counter along one-fourth of an ellipse whose major axis is substantially parallel to the second direction, but may be shaped to have a different curved contour e.g. along less than one-fourth of a circle or an ellipse.

In the planar antenna 101 shown in FIG. 1, the first planar conductor 21 and the second planar conductor 22 each have a grid-like shape with holes hollowed-out from the conductor 20 (the hollowed-out portion with the plurality of holes). In the planar antenna 101 shown in FIG. 1, the hollowed-out portion is formed in each of the first planar conductor 21 and the second planar conductor 22.

In this embodiment, the first planar conductor 21 includes the first hollowed-out portion 23 overlapping the light shielding region 61 and a first section of the second hollowed-out portion 24 overlapping the transmission region 62 (in the example shown in FIG. 1, a section of the second hollowed-out portion on the second direction side with respect to the open end 44). On the other hand, the second planar conductor 22 includes a second section of the second hollowed-out portion 24 overlapping the transmission region 62 (in the example shown in FIG. 1, a section of the second hollowed-out portion on the fourth direction side with respect to the open end 44).

In the case where the conductor 20 is applied by printing to the glass plate 65, if the metal area of the conductor 20 is too wide, the formability of the glass may be lowered due to a difference in heat absorption between the glass and the metal. By forming the hollowed-out portion, however, it is possible to widen the area of the conductor 20 while ensuring the formability of the glass. The flexibility of design of the slot antenna is improved as the area of the conductor 20 is widened.

In the present embodiment, at locations on which the feeding conductor part 7 and the ground conductor part 8 are not provided, the grid-like hollowed-out portion is formed in the first planar conductor 21; and the grid-like hollowed-out portion is formed in the second planar conductor 22. The shape of the respective hollowed-outs (holes) in the hollowed-out portions is not limited to a rectangular shape and can be a polygonal shape other than rectangular shape (e.g. a triangular shape or a hexagonal shape), a circular shape or any other shape.

Figure 2:
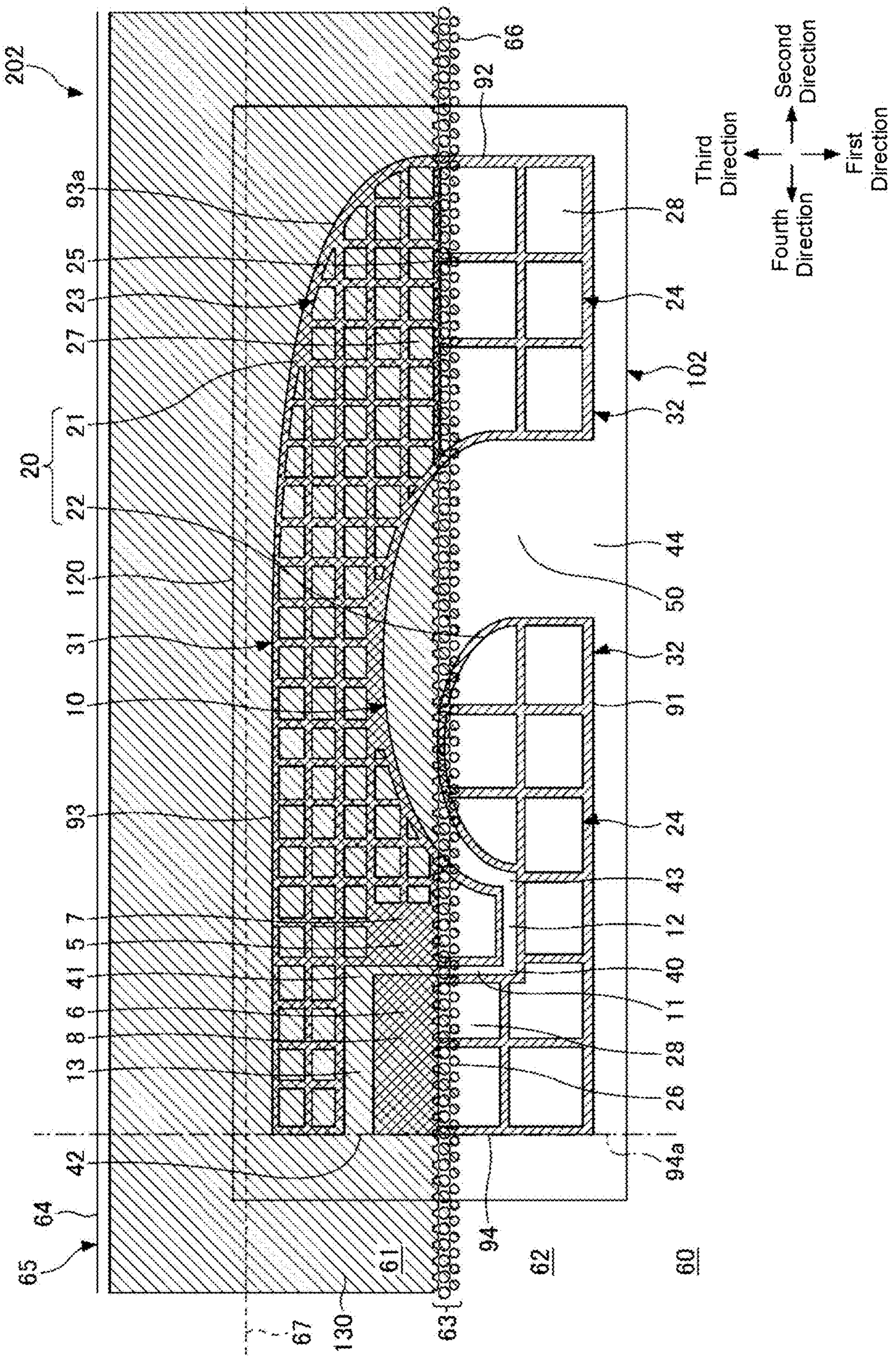
FIG. 2 is an enlarged plan view illustrating a part of a window glass for a vehicle according to a second embodiment.

FIG. 2 is an enlarged plan view illustrating a part of the window glass for a vehicle according to the second embodiment. Herein, description of the configurations and effects similar to those of the above-described embodiment is omitted by citing the above descriptions. A planar antenna 102 of a window glass 202 according to the second embodiment is different from that according to the first embodiment in that the value of $D_1/D_2$ in the second embodiment is smaller than that in the first embodiment. This leads to further improved appearance.

Figure 3:
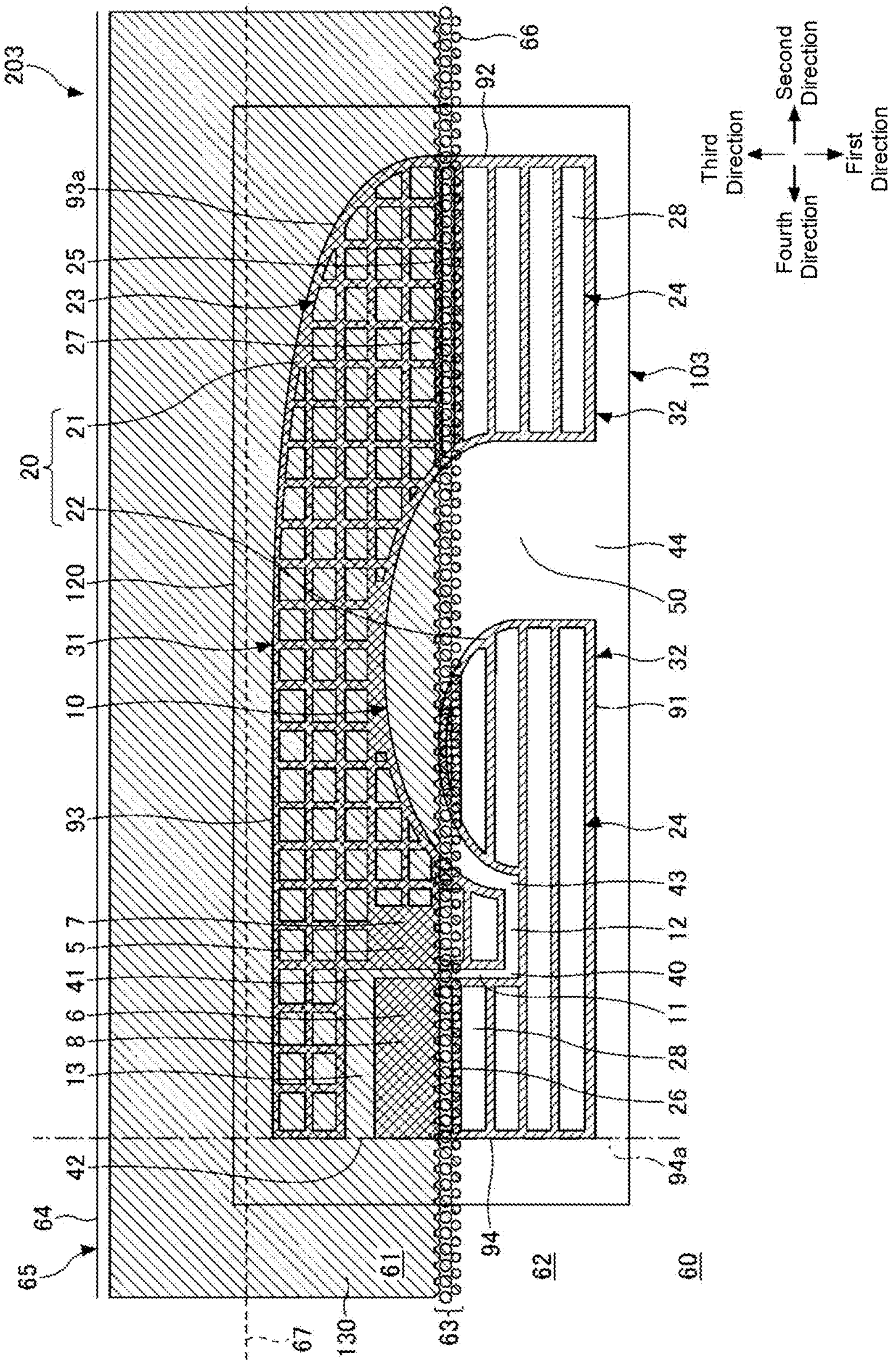
FIG. 3 is an enlarged plan view illustrating a part of a window glass for a vehicle according to a third embodiment.

FIG. 3 is an enlarged plan view illustrating a part of the window glass for a vehicle according to the third embodiment. Herein, description of the configurations and effects similar to those of the above-described embodiments is omitted by citing the above descriptions. A planar antenna 103 of a window glass 203 according to the third embodiment is different from that according to the first embodiment in that the longitudinal direction of the shape of the holes 28 is set as the second direction. This leads to further improved appearance.

In the example shown in FIG. 3, the plurality of holes 28 are aligned in the first direction. Vertical lines of the second conductor part 32 (that is, conductor segments extending in the first direction) are removed. With no vertical lines, the planar antenna is simplified in appearance and thereby further improved in appearance.

Figure 4:
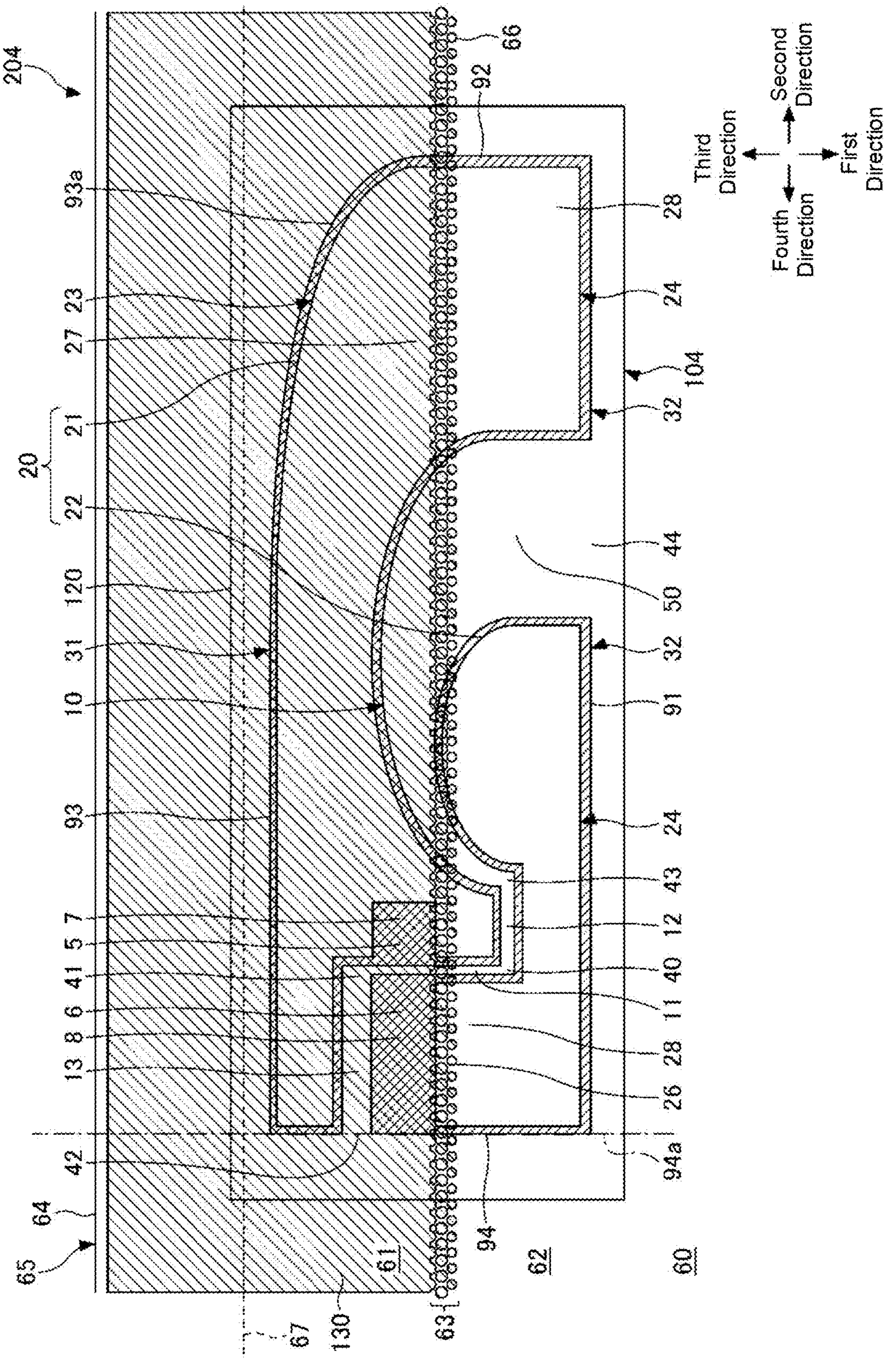
FIG. 4 is an enlarged plan view illustrating a part of a window glass for a vehicle according to a fourth embodiment.

FIG. 4 is an enlarged plan view illustrating a part of the window glass for a vehicle according to the fourth embodiment. Herein, description of the configurations and effects similar to those of the above-described embodiments is omitted by citing the above descriptions. A planar antenna 104 of a window glass 204 according to the fourth embodiment is different from that according to the first embodiment in that the second hollowed-out portion 24 includes only a single hole 28 in a closed loop region surrounded by the boundary 66 and the outer edge of the planar antenna 104. This leads to further improved appearance. The planar antenna 104 according to the fourth embodiment is also different from that according to the first embodiment in that the first hollowed-out portion 23 includes only a single hole 27 in a closed loop region surrounded by the boundary 66 and the outer edge of the planar antenna 104.

In the example shown in FIG. 4, the first section of the second hollowed-out portion 23 (in this example, the section of the second hollowed-out portion on the second direction side with respect to the open end 44) includes only a single hole 28 in the closed loop region surrounded by the boundary 66 and the outer edge of the second conductor part 32. Similarly, the second section of the second hollowed-out portion 23 (in this example, the section of the second hollowed-out portion on the fourth direction side with respect to the open end 44) includes only a single hole 28 in the closed loop region surrounded by the boundary 66 and the outer edge of the second conductor part 32. The first hollowed-out portion 23 includes only a single hole 27 in the closed loop region surrounded by the boundary 66 and the outer edge of the first conductor part 31.

Figure 5:
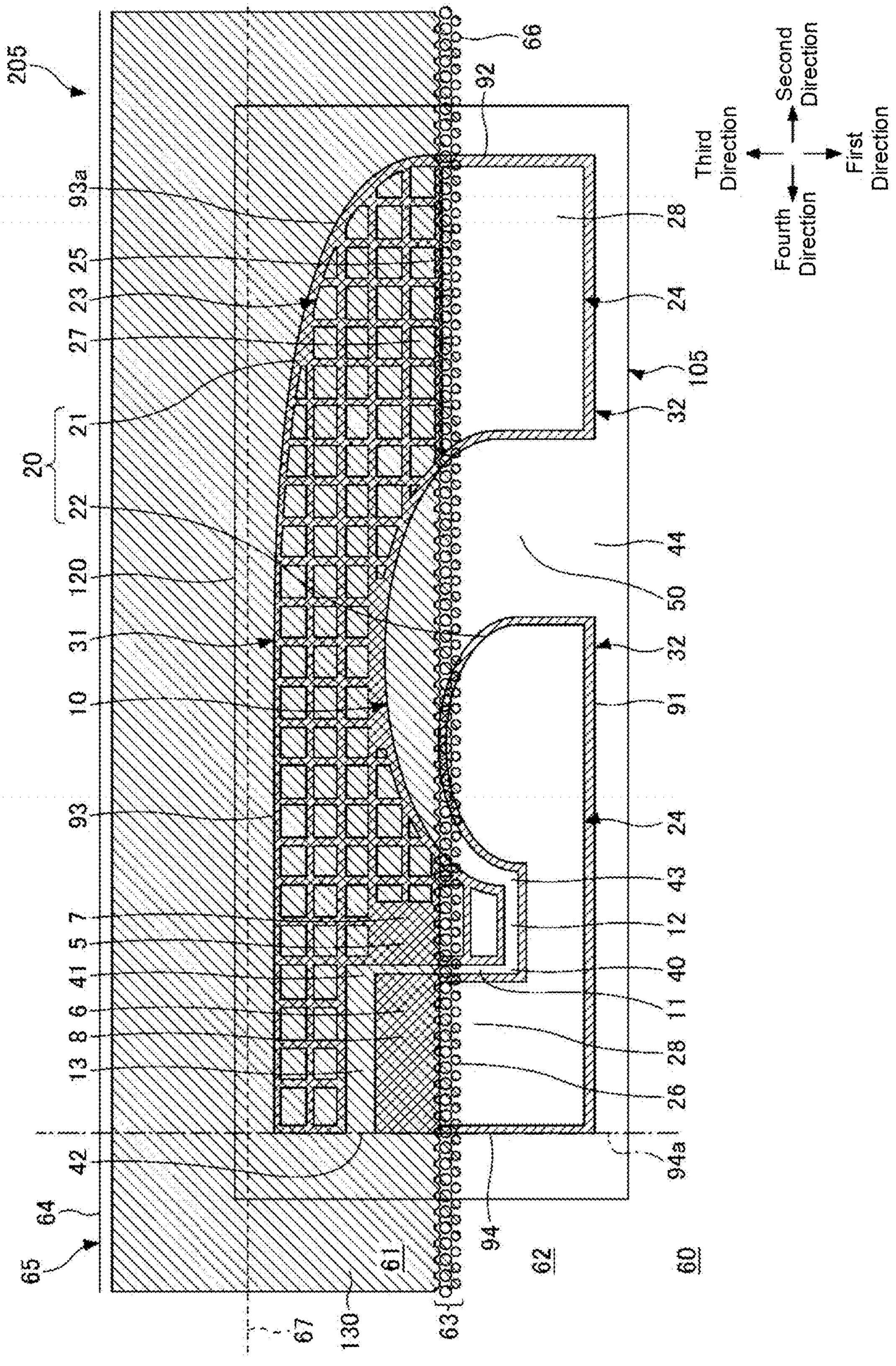
FIG. 5 is an enlarged plan view illustrating a part of a window glass for a vehicle according to a fifth embodiment.

FIG. 5 is an enlarged plan view illustrating a part of the window glass for a vehicle according to the fifth embodiment. Herein, description of the configurations and effects similar to those of the above-described embodiments is omitted by citing the above descriptions. A planar antenna 105 of a window glass 205 according to the fifth embodiment is different from that according to the fourth embodiment in that the shape of the first hollowed-out portion 23 in the fifth embodiment is the same as that in the first embodiment. This not only leads to further improved appearance, but also makes it easy to ensure the conductor area of the conductor 20 as compared to the fourth embodiment and thereby makes it easy to ensure antenna functions.

Explanation will be now given of measurement results of VSWR as one of the antenna functions of the planar antennas according to the respective embodiments.

FIGS. 6 to 10 are diagrams illustrating examples of actual measurement results of the VSWR of the planar antennas according to the first to fifth embodiments, respectively. FIG. 11 is a diagram illustrating an example of simulation results of the VSWR of another planar antenna according to the first embodiment in which the first conductor part 31, the first hollowed-out portion 23, the second conductor part 32 and the second hollowed-out portion 24 were of different dimensions. The VSWR refers to a voltage standing wave ratio. Preferably, the VSWR is 3.5 or lower. It means that the antenna is better impedance-matched as the VSWR is closer to 1. In the range of 600 MHz to 6 GHz, the reference value (3.5 or lower) of the VSWR is one example; and there may be a frequency band with a VSWR exceeding 3.5. It is however preferable that the frequency band exceeding the predetermined VSWR is narrow.

Figure 6:
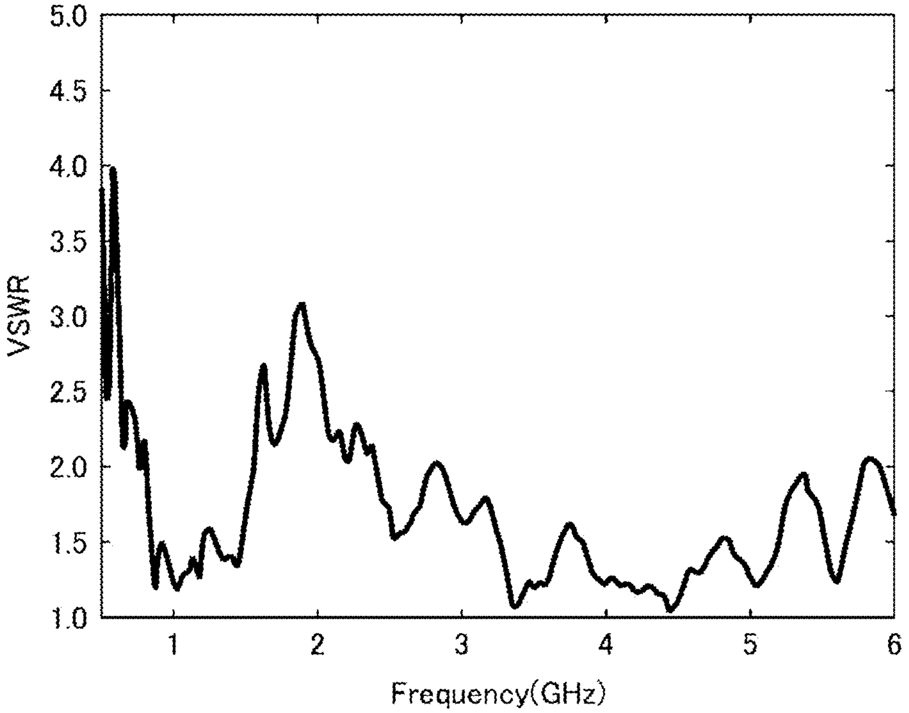
FIG. 6 is a diagram illustrating an example of actual measurement results of VSWR of a planar antenna according to the first embodiment.

In the case of the planar antenna 101 (FIG. 1), the VSWR was 3.5 or lower in the band from 600 MHz to 6 GHz as shown in FIG. 6. These obtained results indicated that the planar antenna was capable of impedance-matching up to a relatively high frequency band ranging to about 6 GHz. In the case of the another planar antenna 101 (FIG. 17), the VSWR exceeded 3.5 in the frequency bands from about 1.0 GHz to about 1.4 GHz and from about 5.0 GHz to about 5.4 GHz and was 3.5 or lower in the other frequency bands as shown in FIG. 11. These obtained results indicated that the another planar antenna was capable of impedance matching up to a relatively high frequency band ranging to about 6 GHz, except from about 1.0 GHz to about 1.4 GHz and from about 5.0 GHz to about 5.4 GHz. The frequency bands from about 1.0 GHz to about 1.4 GHz and from about 5.0 GHz to about 5.4 GHz would be thus set as non-use frequency bands.

Figure 7:
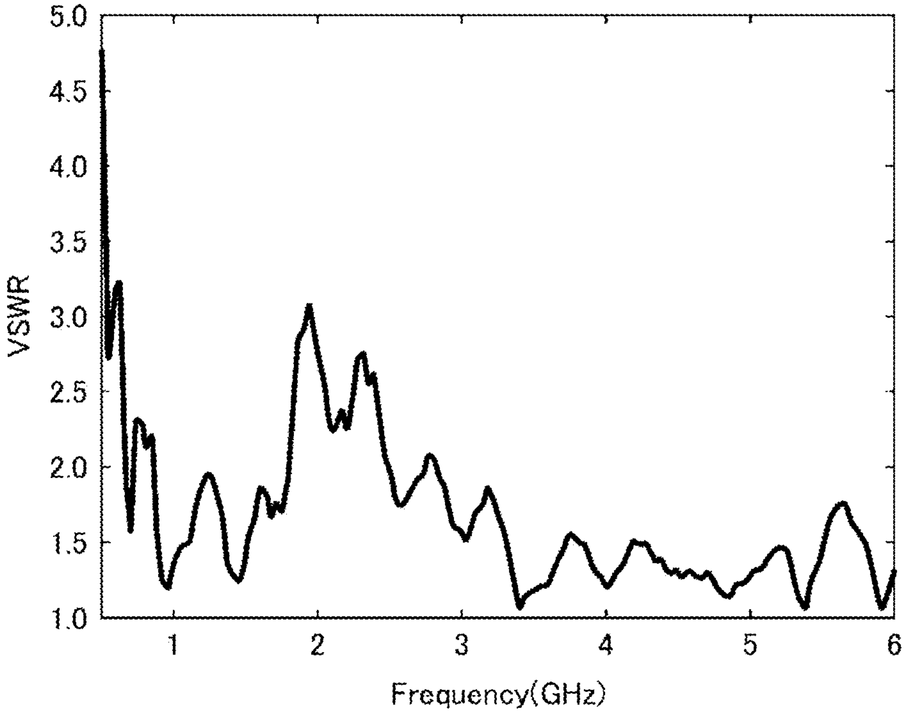
FIG. 7 is a diagram illustrating an example of actual measurement results of VSWR of a planar antenna according to the second embodiment.

As shown in FIG. 7, the results were obtained that the planar antenna 102 (FIG. 2) were capable of impedance-matching up to a relatively high frequency band ranging to about 6 GHz in the same manner as the planar antenna 101 (FIG. 1).

Figure 8:
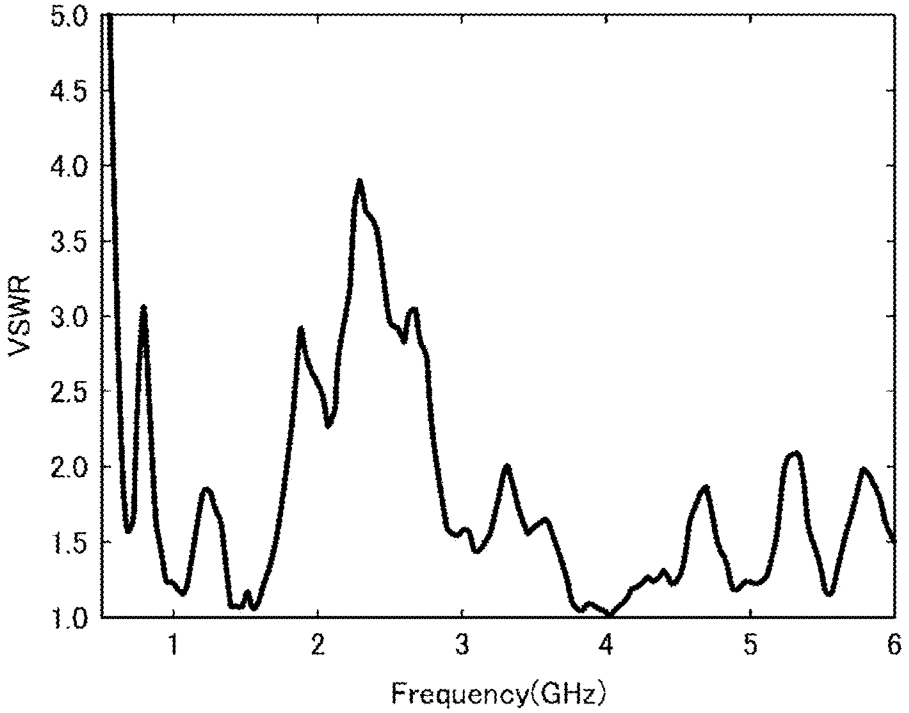
FIG. 8 is a diagram illustrating an example of actual measurement results of VSWR of a planar antenna according to the third embodiment.

In the case of the planar antenna 103 (FIG. 3), the VSWR exceeded 3.5 in the frequency band at around 2.5 GHz and was 3.5 or lower in the other frequency bands as shown in FIG. 8. These obtained results indicated that the planar antenna was capable of impedance-matching up to a relatively high frequency band ranging to about 6 GHz, except at around 2.5 GHz. The frequency band at around 2.5 GHz would be thus set as a non-use frequency band.

Figure 9:
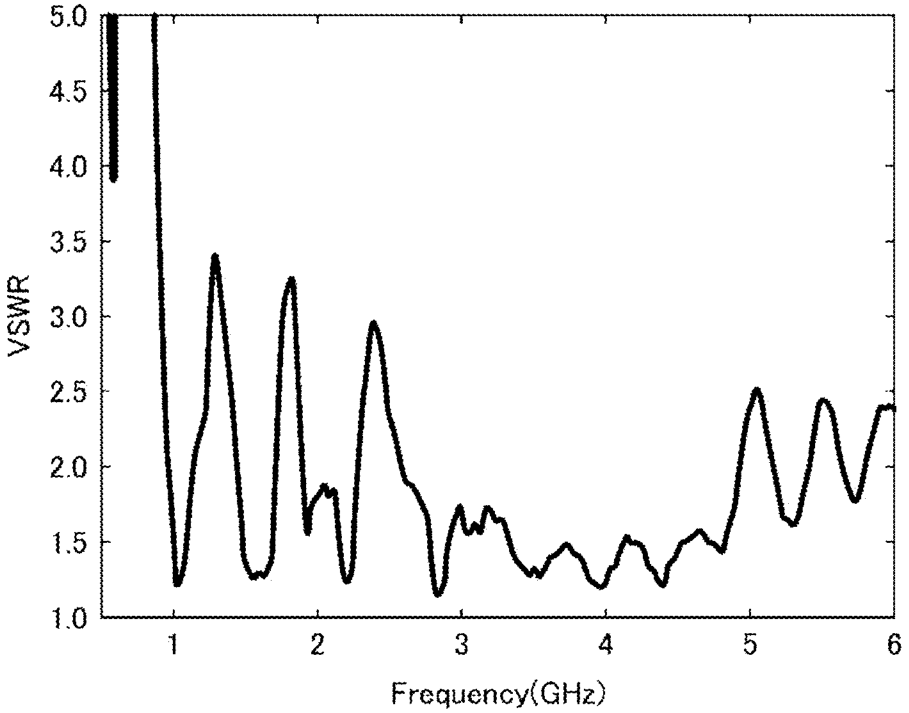
FIG. 9 is a diagram illustrating an example of actual measurement results of VSWR of a planar antenna according to the fourth embodiment.

In the case of the planar antenna 104 (FIG. 4), the VSWR exceeded 3.5 in the frequency band of lower than 1.0 GHz and was 3.5 or lower in the frequency band of 1.0 GHz or higher as shown in FIG. 9. These obtained results indicated that the planar antenna was capable of impedance-matching up to a relatively high frequency band ranging to about 6 GHz, except lower than 1.0 GHz. The frequency band of lower than 1.0 GHz would be thus set as a non-use frequency band.

Figure 10:
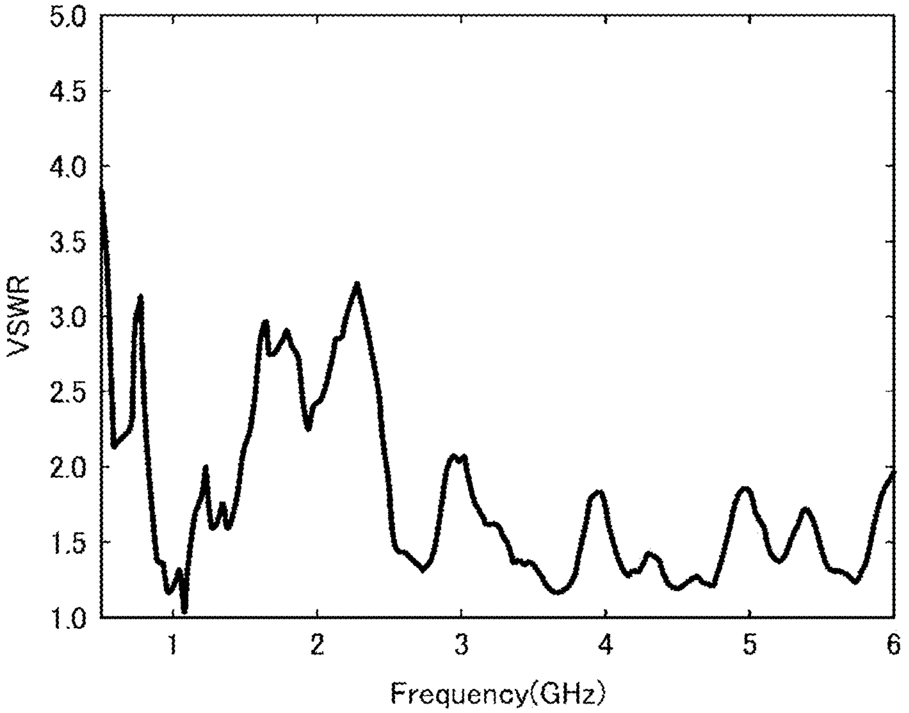
FIG. 10 is a diagram illustrating an example of actual measurement results of VSWR of a planar antenna according to the fifth embodiment.
Figure 11:
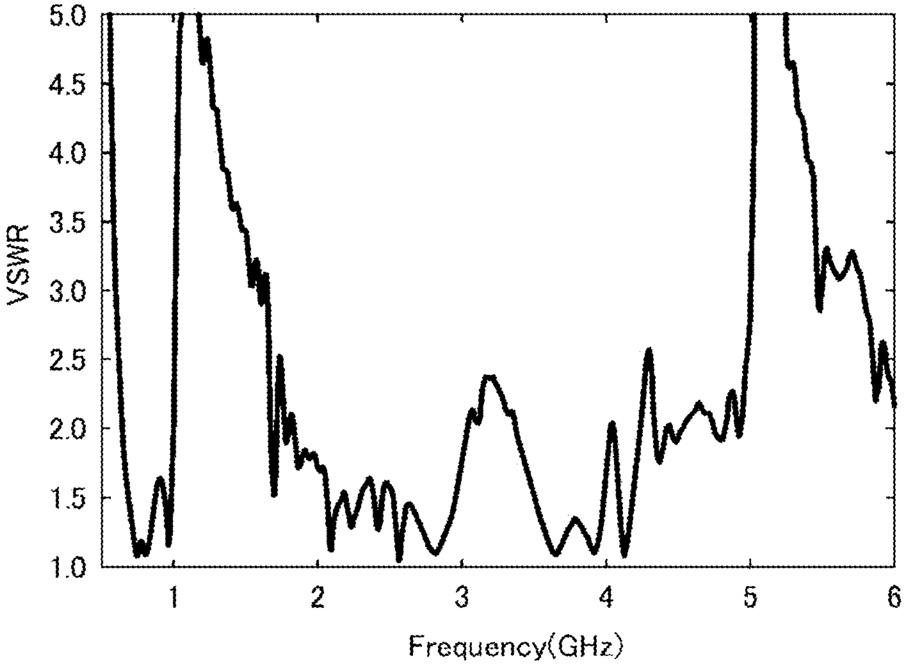
FIG. 11 is a diagram illustrating an example of simulation results of VSWR of another planar antenna according to the first embodiment.

As shown in FIG. 10, the results were obtained that the planar antenna 105 (FIG. 5) were capable of impedance-matching up to a relatively high frequency band ranging to about 6 GHz in the same manner as the planar antenna 101 (FIG. 1).

Figure 12:
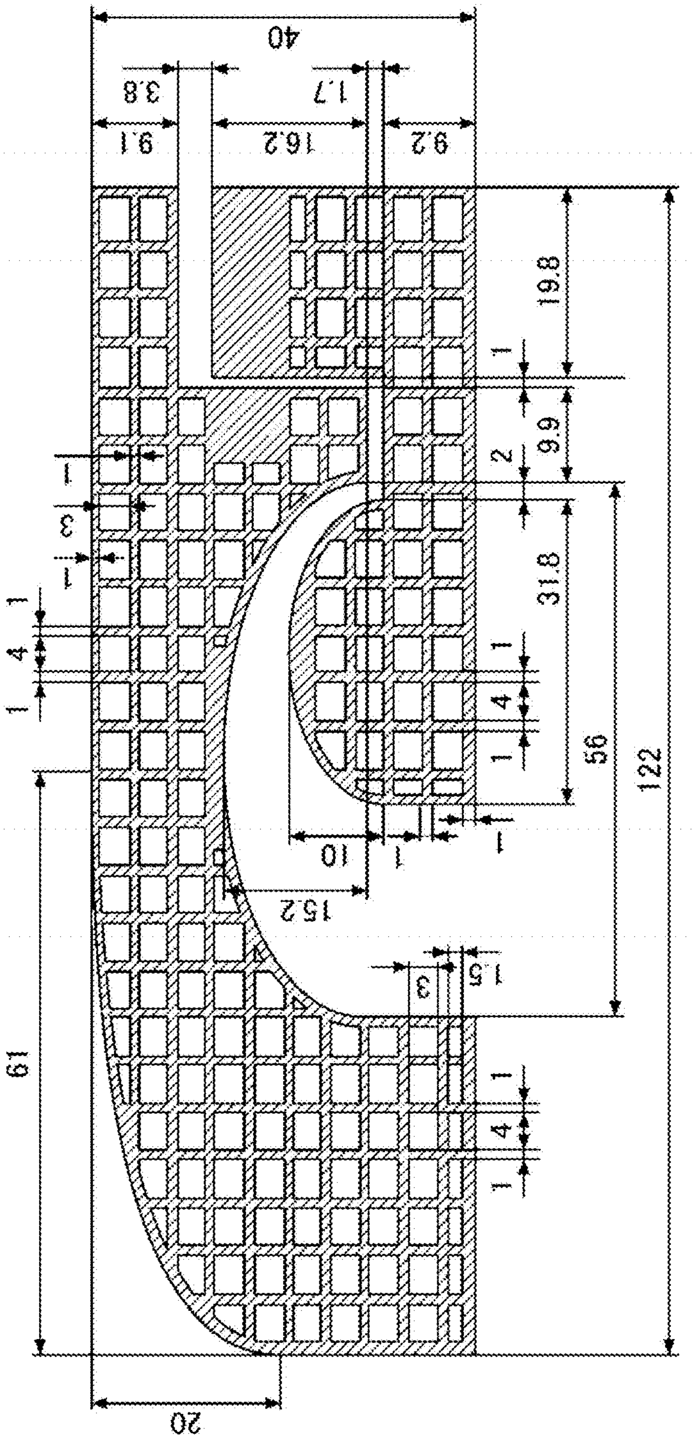
FIG. 12 is a diagram illustrating dimensions of the planar antenna according to the first embodiment as used in the actual measurement of the VSWR.
Figure 13:
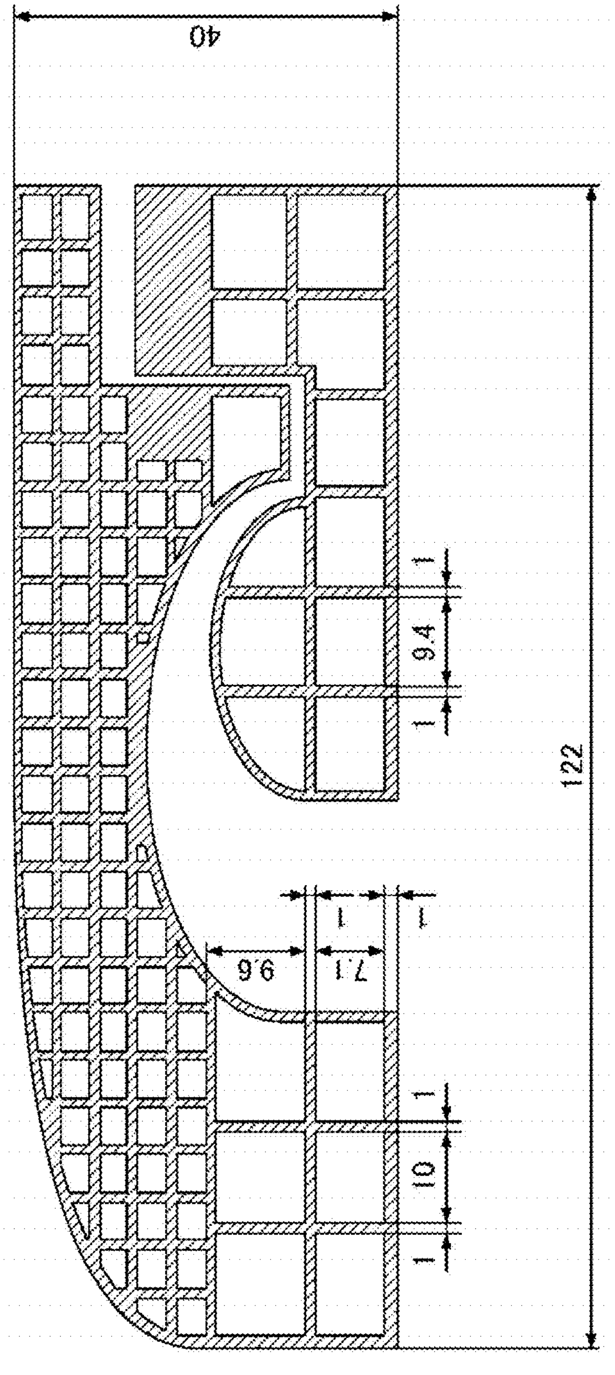
FIG. 13 is a diagram illustrating dimensions of the planar antenna according to the second embodiment as used in the actual measurement of the VSWR.
Figure 14:
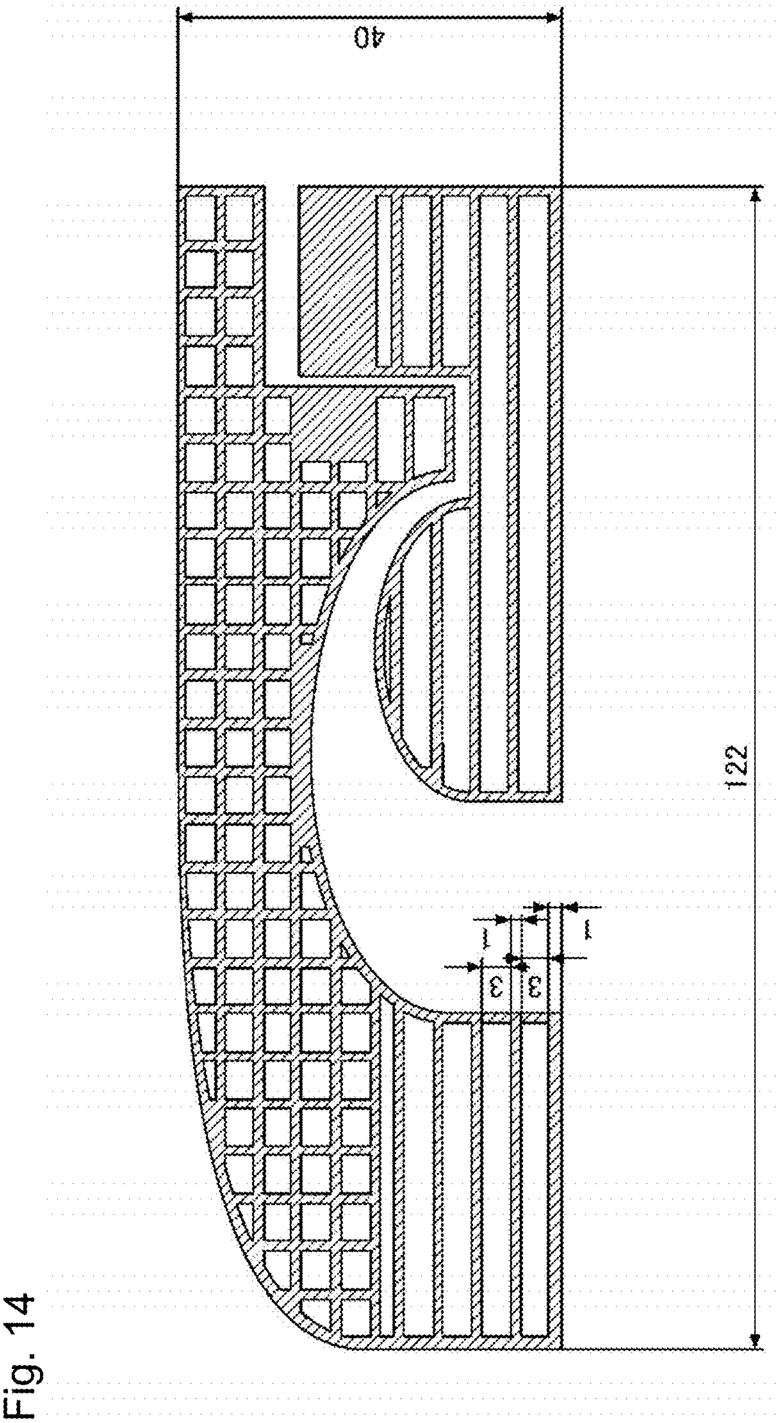
FIG. 14 is a diagram illustrating dimensions of the planar antenna according to the third embodiment as used in the actual measurement of the VSWR.
Figure 15:
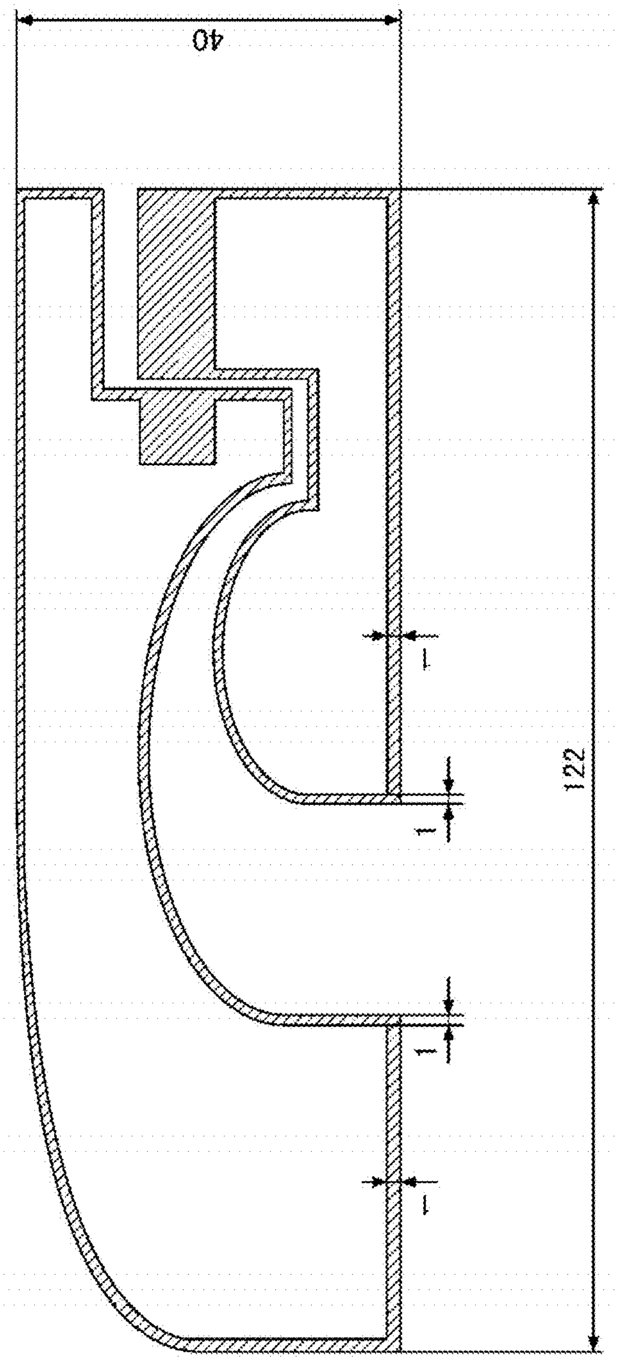
FIG. 15 is a diagram illustrating dimensions of the planar antenna according to the fourth embodiment as used in the actual measurement of the VSWR.
Figure 16:
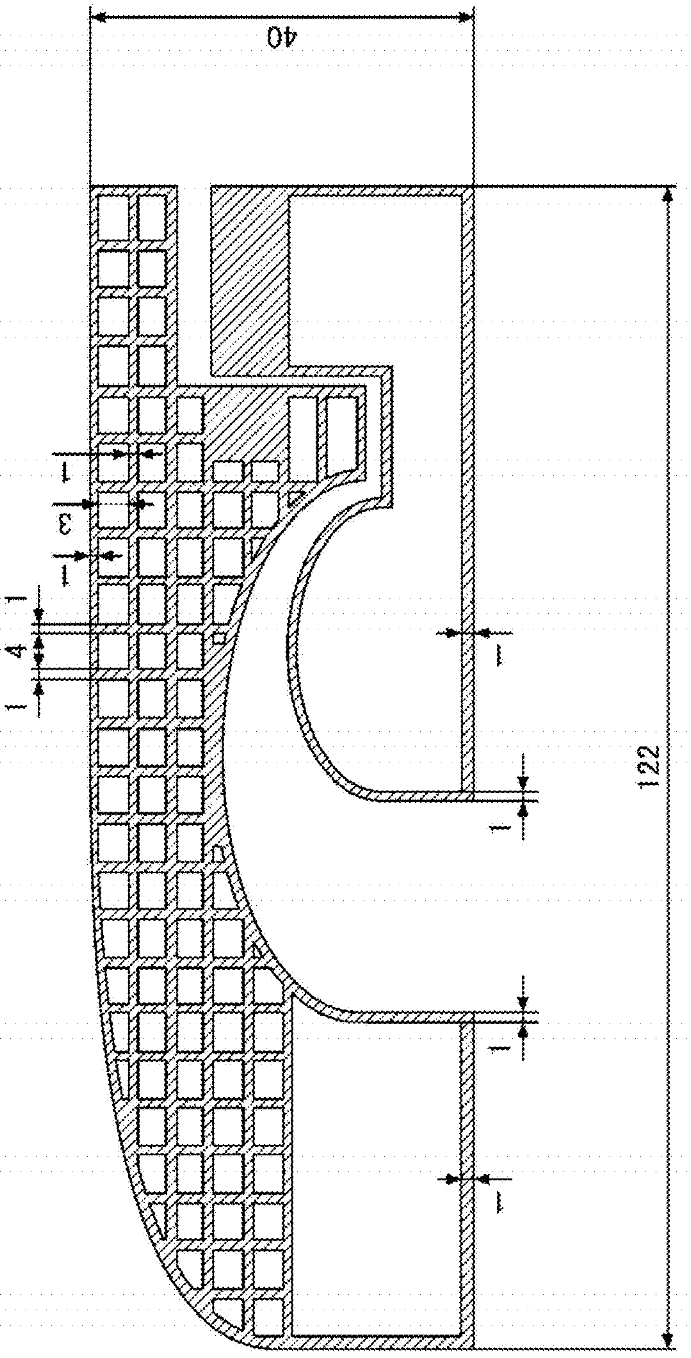
FIG. 16 is a diagram illustrating dimensions of the planar antenna according to the fifth embodiment as used in the actual measurement of the VSWR.
Figure 17:
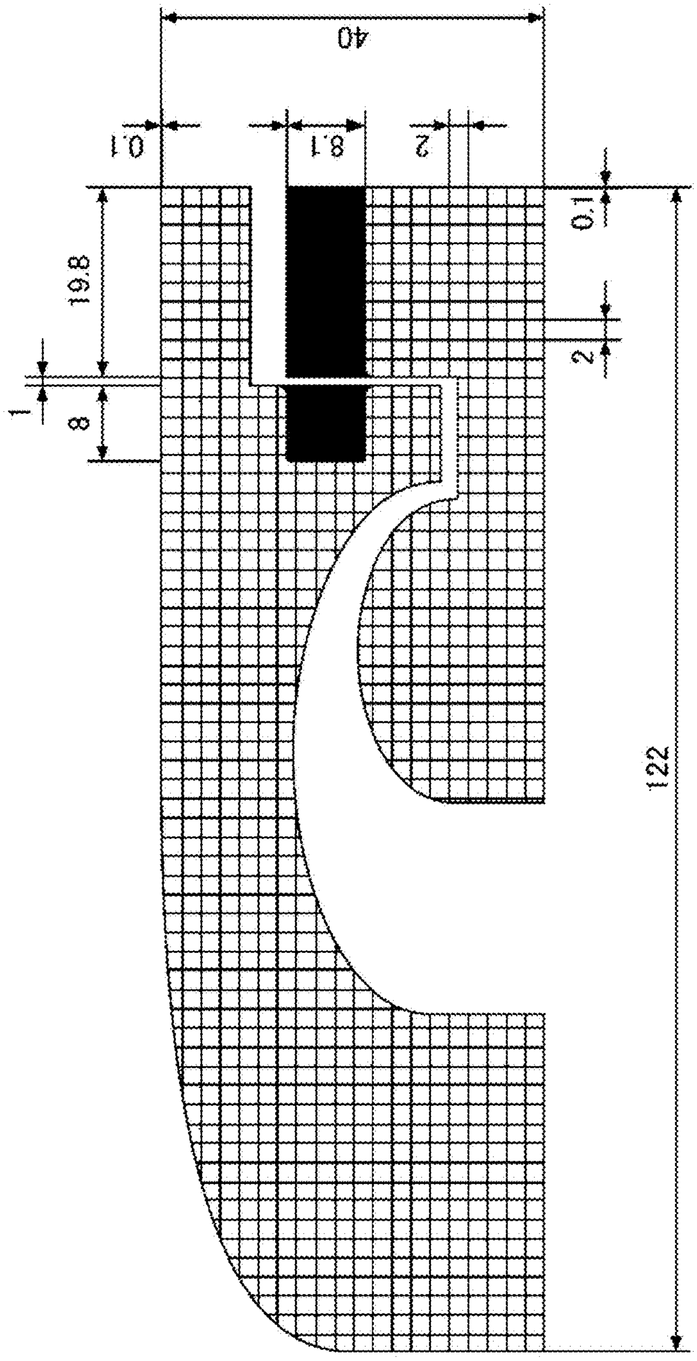
FIG. 17 is a diagram illustrating dimensions of the another planar antenna according to the first embodiment as used in the simulation of the VSWR.

In the actual measurements and simulation of FIGS. 6 to 11, the dimensions common to the respective planar antennas were set to values (unit: mm) shown in FIG. 12; and the dimensions specific to the respective planar antennas were set to values (unit: mm) shown in FIGS. 12 to 17. In FIG. 17, the line width (including its outermost edge) was 0.1 mm. In each of the actual measurements, the planar antenna was arranged on a passenger-side upper portion of a windshield of a vehicle; and the shortest distance between the planar antenna and a flange (a metallic window frame for fixing a window glass) was set to 20 mm.

FIG. 18 is a table illustrating respective condition values in the actual measurements and simulation of the VSWR. In FIG. 18, #1 to #6 correspond to, in this order, the planar antennas 101 to 105 and 101 (the another planar antenna according to the first embodiment); and #0 corresponds to the case where the planar antenna 101 was a solid planar antenna with no hollowed-out portion. Further, #* refers to any of #1 to #6; $S_{c2}$ refers to the area of the second conductor part 32; $S_{c1}$ refers to the area of the first conductor part 31; and $S_v$ refers to the total area of the plurality of holes 28 in the transmission region 62.

In any of the cases of #1 to #6, good impedance-matching results as shown in FIGS. 6 to 11 were obtained by satisfaction of the above formula "$D_1/D_2>1.00$".

Figure 19:
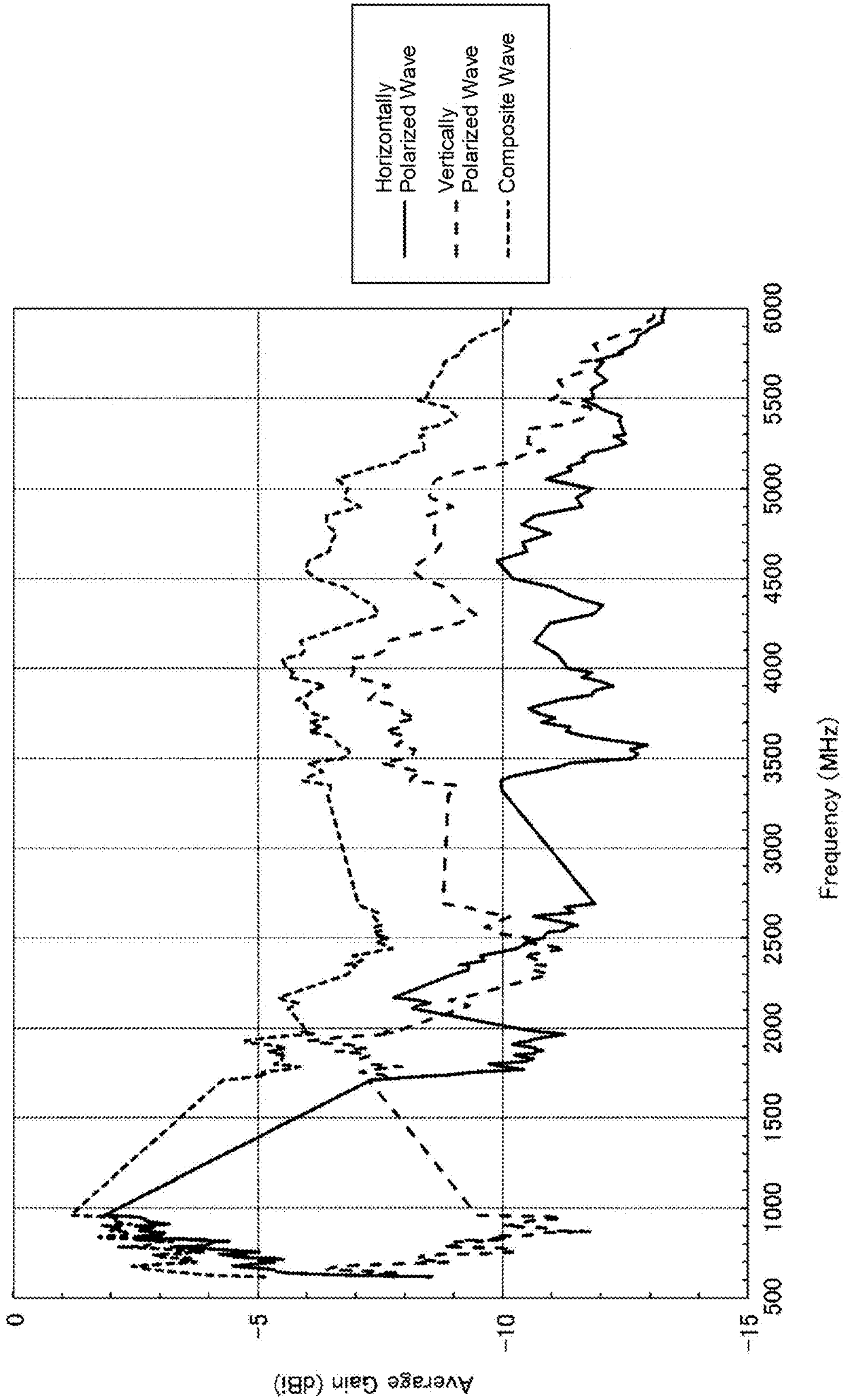
FIG. 19 is a diagram illustrating an example of actual measurement results of an antenna gain of the planar antenna according to the second embodiment.
Figure 20:
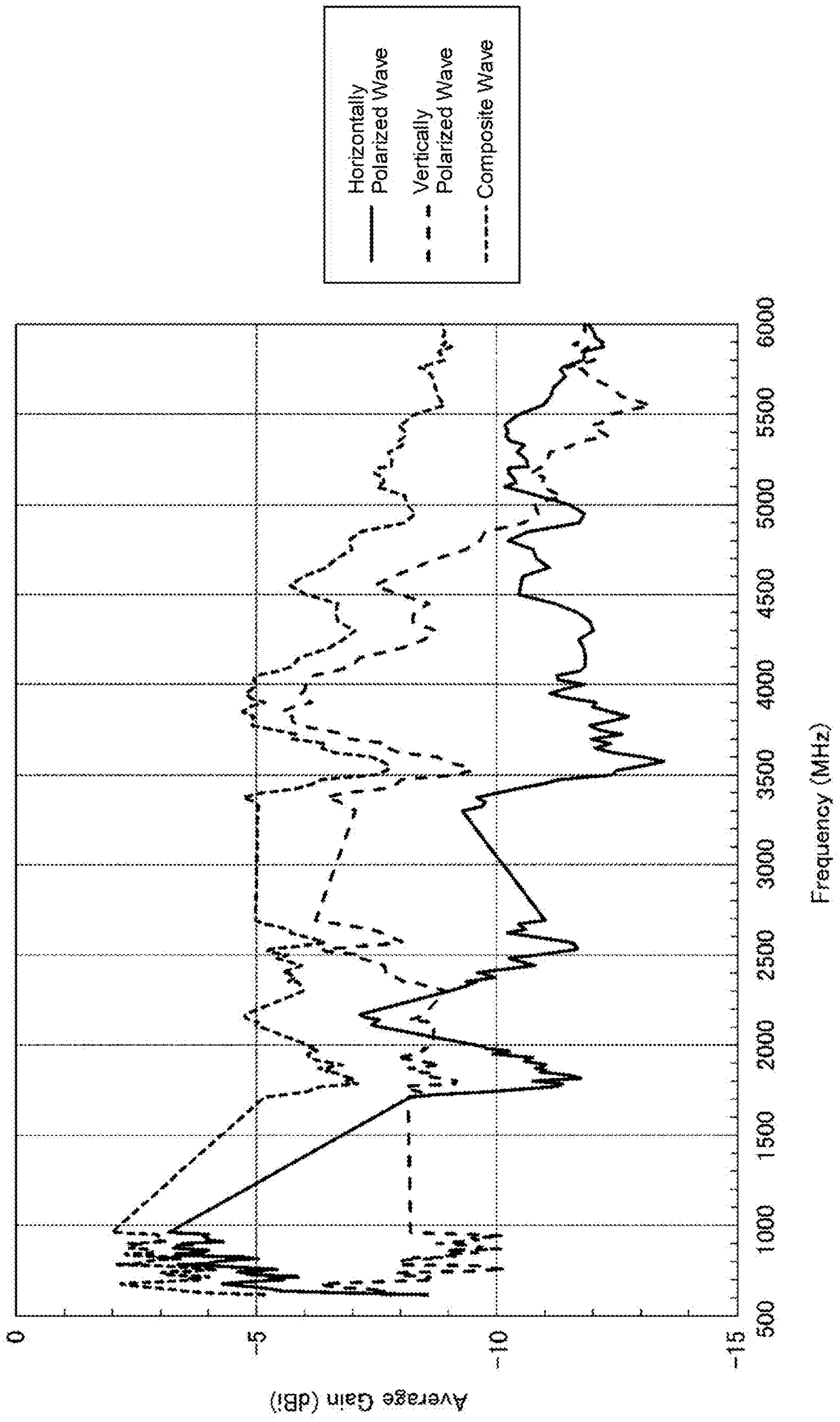
FIG. 20 is a diagram illustrating an example of actual measurement results of an antenna gain of the planar antenna according to the fifth embodiment.

FIG. 19 is a diagram illustrating an example of measurement results of an antenna gain of the planar antenna (FIG. 2) according to the second embodiment. FIG. 20 is a diagram showing an example of measurement results of an antenna gain of the planar antenna (FIG. 5) according to the fifth embodiment. The antenna gain shown on the vertical axis of FIGS. 19 and 20 refers to an average value of antenna gains actually measured at each azimuth angle from 0° to 358° with respect to the horizontal plane (elevation angle) 0°. In the actual measurements of FIGS. 19 and 20, the dimensions of the respective antennas were also set to values shown in FIGS. 12, 13 and 16. Good results were also obtained for the antenna gain, as one of the antenna functions, up to a relatively high frequency band ranging to about 6 GHz.

Although explanation of the embodiments has been made as above, the technique of the present disclosure is not limited to the above-mentioned embodiments. Various modifications and improvements of the above-mentioned embodiments, such as combination/replacement of one embodiment with/by a part or a whole of another embodiment, can be made.

For example, the planar antenna disposed on the glass plate may be a part or all of a plurality of antennas included in a diversity antenna or MIMO (Multiple-Input and Multiple-Output) antenna system. This leads to improved communication quality.

REFERENCE SYMBOLS

5: Feeding point
6: Ground point
7: Feeding conductor part
8: Ground conductor part
10 to 17: Slot
20: Conductor
21: First planar conductor
22: Second planar conductor
23: First hollowed-out portion
24: Second hollowed-out portion
25, 26: Outer edge
27, 28: Hole
31: First conductor part
32: Second conductor part
40, 41, 43: End
42, 44: Open end
50: J-shaped slot
60: Main surface
61: Light shielding region
62: Transmission region
63: Boundary region
64: Outer peripheral edge
65: Glass plate

66: Boundary
67: Flange end
91, 92, 93, 94: Outer edge
93*a*: Curved line part
94*a*: Imaginary line
101 to 105: Planar antenna
120: Dielectric layer
130: Light shielding layer
201 to 205: Window glass

What is claimed is:

1. A window glass for a vehicle, comprising: a glass plate; a light shielding layer formed on the glass plate; and a planar antenna including a planar conductor having formed therein a hollowed-out portion with at least one hole, wherein, in plan view of the glass plate, when a region including the light shielding layer is assumed as a light shielding region; and a region including no light shielding layer is assumed as a transmission region, the planar antenna is arranged to lie across a boundary between the light shielding region and the transmission region, and has a first conductor part overlapping the light shielding region and a second conductor part overlapping the transmission region, and wherein, when an area of overlap of the planar antenna with the light shielding region is assumed as a first overlap area; an area of overlap of the planar antenna with the transmission region is assumed as a second overlap area; a ratio of an area of the first conductor part to the first overlap area is assumed as a first conductor density; and a ratio of an area of the second conductor part to the second overlap area is assumed as a second conductor density, the second conductor density is lower than the first conductor density, wherein the hollowed-out portion includes a first hollowed-out portion formed in the first conductor part and a second hollowed-out portion formed in the second conductor part, wherein an area of the second hollowed-out portion is larger than an area of the first hollowed-out portion, wherein each of the first hollowed-out portion and the second hollowed-out portion has a plurality of holes, and wherein an area of the widest one of the plurality of holes in the second hollowed-out portion is larger than an area of the widest one of the plurality of holes in the first hollowed-out portion.

2. The window glass for a vehicle according to claim 1, wherein an area of the narrowest one of the plurality of holes in the second hollowed-out portion is larger than an area of the narrowest one of the plurality of holes in the first hollowed-out portion.

3. The window glass for a vehicle according to claim 1, wherein the planer antenna has a feeding conductor part with a feeding point and a ground conductor part with a ground point, and at least one of the feeding point and the ground point is included in the first conductor part.

4. The window glass for a vehicle according to claim 1, wherein the boundary is along at least a part of an outer edge of the hollowed-out portion.

5. The window glass for a vehicle according to claim 4, wherein the hollowed-out portion in the transmission region has only a single hole in a closed loop region surrounded by the boundary and an outer edge of the planar antenna.

6. The window glass for a vehicle according to claim 1, wherein the hollowed-out portion has a plurality of holes aligned along the boundary.

7. The window glass for a vehicle according to claim 1, wherein the hollowed-out portion has a plurality of holes aligned in a direction substantially orthogonal to the boundary.

8. The window glass for a vehicle according to claim 1, wherein the following formula is satisfied:

$$S_v/S_{c2} \geq 1.0$$

where $S_v$ is a total area of the holes in the transmission region; and $S_{c2}$ is the area of the second conductor part.

9. The window glass for a vehicle according to claim 8, wherein the holes in the transmission region are substantially uniformly arranged.

10. The window glass for a vehicle according to claim 1, wherein the following formula is satisfied:

$$D_1/D_2 \geq 1.03$$

where $D_1$ is the first conductor density; and $D_2$ is the second conductor density.

11. The window glass for a vehicle according to claim 1, wherein the planar antenna is configured to transmit and receive radio waves of 600 MHz or higher.

12. The window glass for a vehicle according to claim 11, wherein the planar antenna is configured to transmit and receive radio waves of 6 GHz or lower.

13. The window glass for a vehicle according to claim 1, comprising a plurality of the planar antennas arranged on the glass plate.

14. The window glass for a vehicle according to claim 1, wherein the glass plate is a glass plate for a windshield, a side glass, a rear glass or a roof glass of a vehicle.

* * * * *